United States Patent [19]
Bauer

[11] Patent Number: 6,060,660
[45] Date of Patent: May 9, 2000

[54] CONSOLIDATION POINT ENCLOSURE

[75] Inventor: Arthur D. Bauer, Southington, Conn.

[73] Assignee: The Siemon Company, Watertown, Conn.

[21] Appl. No.: 09/034,641

[22] Filed: Mar. 4, 1998

[51] Int. Cl.[7] ................................................... H02G 3/08
[52] U.S. Cl. ..................... 174/52.1; 174/52.4; 220/4.02; 361/641; 16/249
[58] Field of Search .................................. 174/52.1, 52.4, 174/67; 220/4.02, 242; 361/641, 658; 16/249, 235

[56] References Cited

U.S. PATENT DOCUMENTS

| | | | |
|---|---|---|---|
| 3,140,344 | 7/1964 | Slater et al. | 174/67 |
| 3,618,804 | 11/1971 | Krause | 220/38 |
| 4,052,561 | 10/1977 | Molay | 381/75 |
| 5,245,507 | 9/1993 | Ericksen | 361/641 |
| 5,387,761 | 2/1995 | Simonis | 174/67 |
| 5,389,740 | 2/1995 | Austin | 174/67 |
| 5,422,436 | 6/1995 | Zachrai | 174/65 R |
| 5,877,450 | 3/1999 | Quin | 174/66 |

FOREIGN PATENT DOCUMENTS

| | | | |
|---|---|---|---|
| 2185524 | 7/1987 | United Kingdom . | |
| 2273955 | 7/1994 | United Kingdom | 16/388 |

OTHER PUBLICATIONS

KRONE Product Catalog, Wiring System Components, Catalog'96, Jan. 31, 1996.
IMRAK Wall Cabinets, Imrak 400, date unknown.
Great Lakes Case & Cabinet Co., Inc., 2,4,6, Foot Patch Panel Cabinet, date unknown.

*Primary Examiner*—Kristine Kincaid
*Assistant Examiner*—Dhiru R Patel
*Attorney, Agent, or Firm*—Cantor Colburn LLP

[57] ABSTRACT

A consolidation point enclosure employing a two piece design in which a cover subassembly is removably mounted to a mounting plate. The cover subassembly includes notches that allow cable to enter the consolidation point enclosure. When the cover subassembly is removed, cables can be routed to the consolidation point enclosure without pulling the cables through restrictive openings. The cover subassembly is then mounted to the mounting plate with the notches straddling the cables. The invention also includes a patch panel mounting assembly that is hingedly mounted to the mounting plate. A pair of spring loaded pins secure the patch panel mounting assembly in an open position which facilitates access to the devices mounted in the patch panel mounting assembly. In alternative embodiments, the mounting plate includes additional support plates for mounting 110 type or 66 type cabling products.

21 Claims, 15 Drawing Sheets

CONSOLIDATION POINT ENCLOSURE

BACKGROUND OF THE INVENTION

1. Field of the Invention

The invention relates generally to an enclosure for telecommunications wiring devices and in particular to an enclosure capable of mounting a variety of wiring products and having a removable cover subassembly for facilitating access to wiring products in the enclosure.

2. Prior Art

Consolidation point enclosures are used to house telecommunications wiring products in a variety of applications (office, industrial, etc.). These enclosures are typically wall mounted and serve as a distribution point for telecommunications wiring and facilitate moving, adding or changing telecommunications wiring. The term "telecommunications" refers to voice, data, network and other applications and is intended to refer to a wide class of wiring applications and products. Such products include wire managers, outlets, connecting blocks and other components typically used in the telecommunications industry. Wiring and cabling as used herein are intended to refer to a variety of signal carrying devices including, but not limited to, copper wire, optical fiber, coaxial cable, etc.

Conventional consolidation point enclosures suffer from a number of drawbacks. The conventional consolidation point enclosure includes a cover subassembly having a base and a hinged cover. The cover subassembly is integral with the structure for mounting the telecommunications wiring products. The one piece design of these enclosures is difficult for the installer to work with. The one piece enclosure style reduces the amount of equipment installation, service, and access space. The cover subassembly can also interfere with access to the telecommunications wiring products mounted in the enclosure. The one piece design also makes it difficult to pull cable through the available access openings located on the sides of the enclosure.

In addition, conventional consolidation point enclosures are designed to receive a single type of telecommunications wiring products (e.g. 19" panels). The same enclosures usually only have a single level for installing 19" panel mounted equipment and usually do not have any mounting features for alternative wiring products (e.g. 110 type and 66 type wiring products). This limits the application of the conventional consolidation point enclosures and necessitates the purchase of application specific enclosures.

SUMMARY OF THE INVENTION

The above-discussed and other drawbacks and deficiencies of the prior art are overcome or alleviated by the consolidation point enclosure of the present invention. The consolidation point enclosure employs a two piece design in which a cover subassembly is removably mounted to a mounting plate. The cover subassembly includes notches that allow cable to enter the consolidation point enclosure. When the cover subassembly is removed, cables can be routed to the consolidation point enclosure without pulling the cables through restrictive openings. The cover subassembly is then mounted to the mounting plate with the notches straddling the cables. The invention also includes a patch panel mounting assembly that is hingedly mounted to the mounting plate. A pair of spring loaded pins secure the patch panel mounting assembly in an open position which facilitates access to the rear side of devices mounted in the patch panel mounting assembly. In alternative embodiments, the mounting plate includes additional support plates for mounting 110 type or 66 type wiring products.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 1:
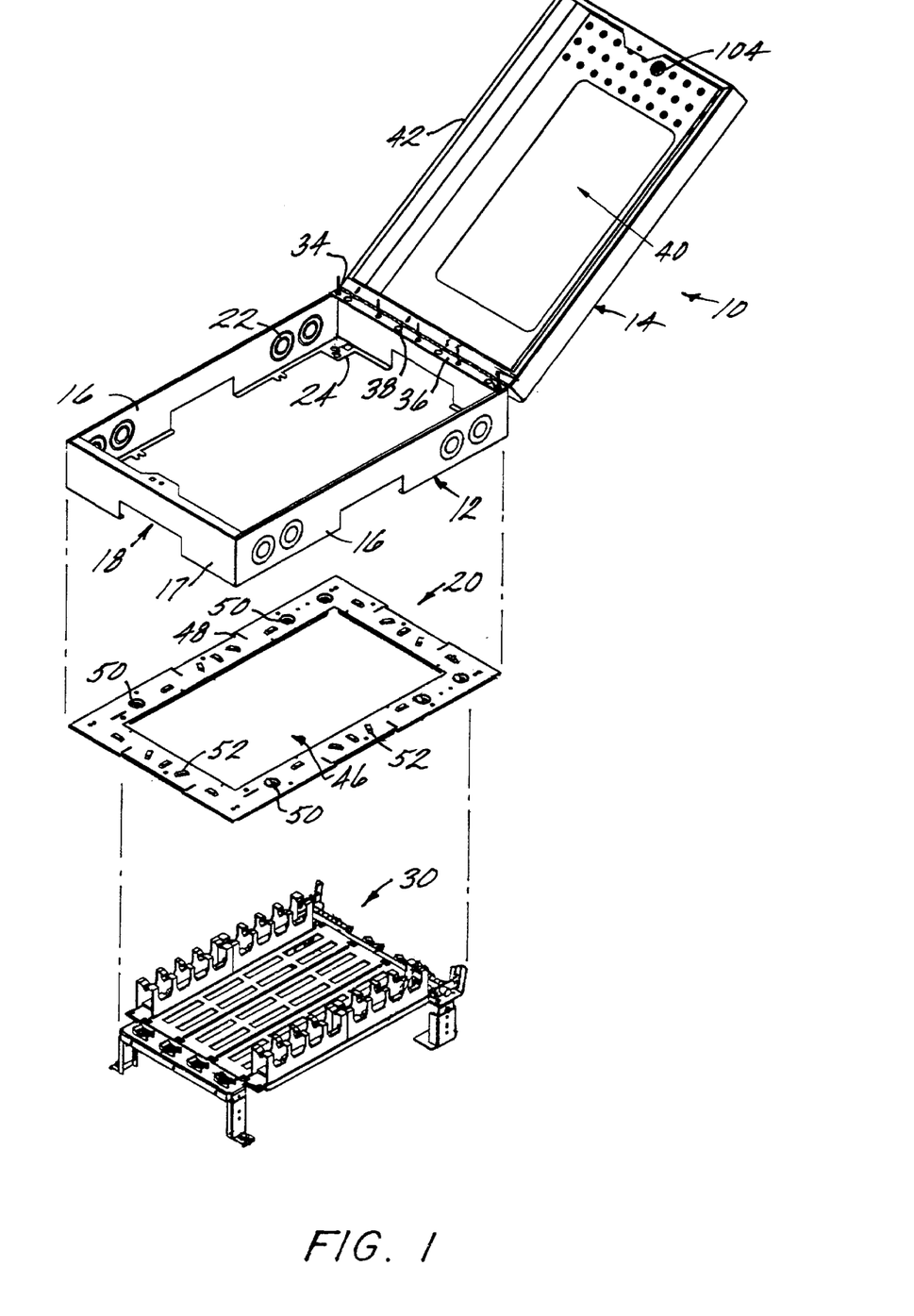
FIG. 1 is an, exploded perspective view of the consolidation point enclosure in accordance with a first embodiment of the invention.

FIG. 1 is an exploded, perspective view of the consolidation point enclosure in accordance with a first embodiment of the invention. The consolidation point enclosure is made up of three major components, namely a cover subassembly 10, mounting plate 20 and patch panel mounting assembly 30. These three main components are preferably made from metal and in an exemplary embodiment are constructed of 0.059" thick cold rolled steel (CRS). The internal mounting brackets (described below) are preferably manufactured from aluminum and CRS. The aluminum brackets are black anodized and the CRS components are powder coated. The consolidation point enclosure is designed to interface with perimeter wireway systems (raceways) through notches 18 in addition to 1" and 2" EMT electrical conduits through knockouts 22.

The patch panel mounting assembly 30 mounts to the mounting plate 20. The cover subassembly 10 is removably mounted to the mounting plate 20. The cover subassembly 10 includes a base 12 and a cover 14. The base 12 is made up of two side walls 16 and two end walls 17 all joined at their respective ends to form a rectangular, open base. Each side wall 16 and end wall 17 includes a rectangular notch 18 which is an important feature of the present invention and allows the cover subassembly 10 to be installed on mounting plate 20 after wires are have been secured to the mounting plate 20 as described below. Side walls 16 also include conventional knockouts 22 to provide additional entry points in the consolidation point enclosure.

Figure 2:
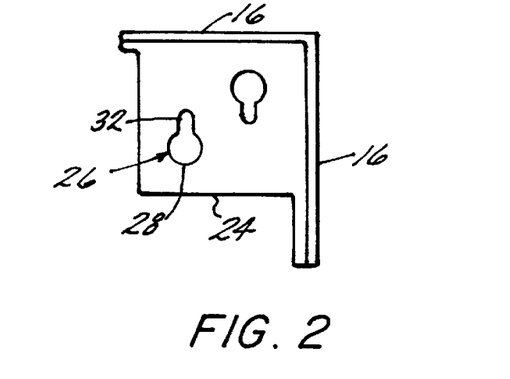
FIG. 2 is a top view of a portion of the cover subassembly.
Figure 3:
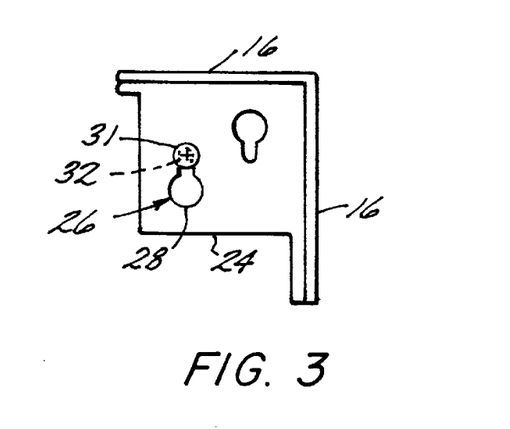
FIG. 3 is a top view of a portion of the cover subassembly having a fastener installed therein.

Each corner of the base 12 includes an inwardly extending plate 24 perpendicular to the respective side wall 16 and end wall 17. Plate 24 has two openings formed therein for receiving a fastener mounted to mounting plate 30. FIG. 2 is a plan view of plate 24 showing the two openings 26 formed in plate 24. Each opening has a first portion 28 and second portion 32, the second portion 32 having an inner dimension smaller than the first portion 28. The first portion 28 allows the head of the fastener on the mounting plate 20 to pass through plate 24. The cover subassembly is then shifted so that the fastener neck is positioned in the second portion 32. The head of the fastener 31 extends beyond the second portion and secures the cover subassembly 10 to the mounting plate 30 as shown in FIG. 3. In accordance with an important feature of the present invention, the openings 26 are oriented in opposite directions allowing the cover subassembly 10 to be mounted with the hinge 34 towards the left or the hinge 34 towards the right. This is beneficial in installations where there is confined space and controlling the direction of the travel of door 14 is beneficial.

The two piece design of the mounting plate 20 and the cover subassembly 10 provides several advantages. It allows the installer to manage and distribute cable to the consolidation point enclosure without the need to forcibly feed (pull) cable bundles and connectors through the otherwise restricted access openings. With the cover subassembly removed, cables are secured to the mounting plate 20 and/or the patch panel mounting assembly 30. When the wiring is complete, the cover subassembly 10 is installed on the mounting plate 20. The notches 18 straddle the cable bundles mounted to the mounting plate 20. This prevents damage to the connectors and cable which could occur with one piece enclosures.

The two piece design also allows the equipment installer an unobstructed working environment, by being able to work without the cover subassembly 10 attached to the mounting plate 20 during an installation. The completely removable cover subassembly 10 allows unlimited access to the consolidation point enclosure components. The removable cover subassembly 10 also provides unobstructed access at any time after initial installation for maintenance, changes, etc.

Cover 14 is secured to base 12 through hinge 34 secured to one end wall 17 at inwardly extending flange 36. Clearance holes 38 are positioned in the flange 36 to provide access to screws securing the hinge 34 to the cover 14. The cover 14 includes an opening 40 which may receive an optional plexiglass window. A foam gasket 42 is placed on the bottom of cover 14 to provide a tight fit between the cover 14 and base 12. Cover 14 also includes a standard telecommunications lock 104 which allows access to the consolidation point enclosure without locating a specific key.

Figure 4:
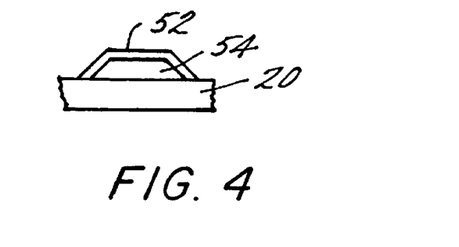
FIG. 4 is a side view of a portion of the mounting plate.

Mounting plate 20 is a generally planar, rectangular plate having a central rectangular opening for providing rear access to the patch panel mounting assembly 30. The mounting plate 20 is designed for either wall or column mount applications. A series of structural bends 48 are provided on the mounting plate 20 to enhance integrity. A series of openings 50 receive fasteners to secure the mounting plate 20 to a wall or rack structure. Protrusions 52 having openings 54 (FIG. 4) there are stamped in the mounting plate for receiving cable managers such as plastic cable ties or hook and loop type material cable management straps. A plurality of protrusions 52 are positioned at each notch 18 when the cover subassembly 10 is mounted to mounting plate 20. This facilitates management of cables entering the consolidation point enclosure at notches 18.

Figure 5:
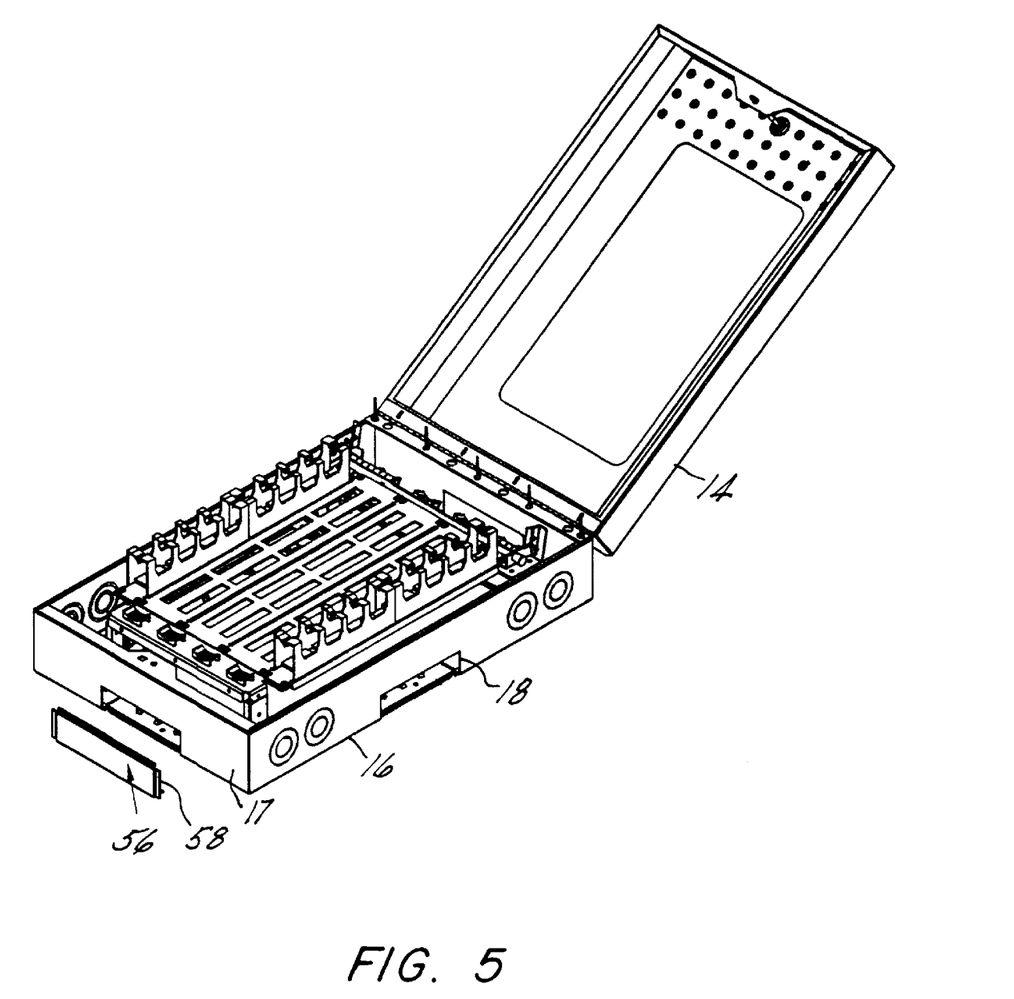
FIG. 5 is a perspective view of the consolidation point enclosure.

FIG. 5 is a perspective view of the assembled consolidation point enclosure. Cover 14 is in the open position and as will be described in more detail below, the patch panel mounting assembly 30 is in the closed position. When cables are not to be routed through openings 18, flush mount cover 56 may be installed in unused openings 18. The flush mount covers 56 have tabs 58 that are positioned on the inside surface of the side wall 16 or end wall 17.

Figure 6:
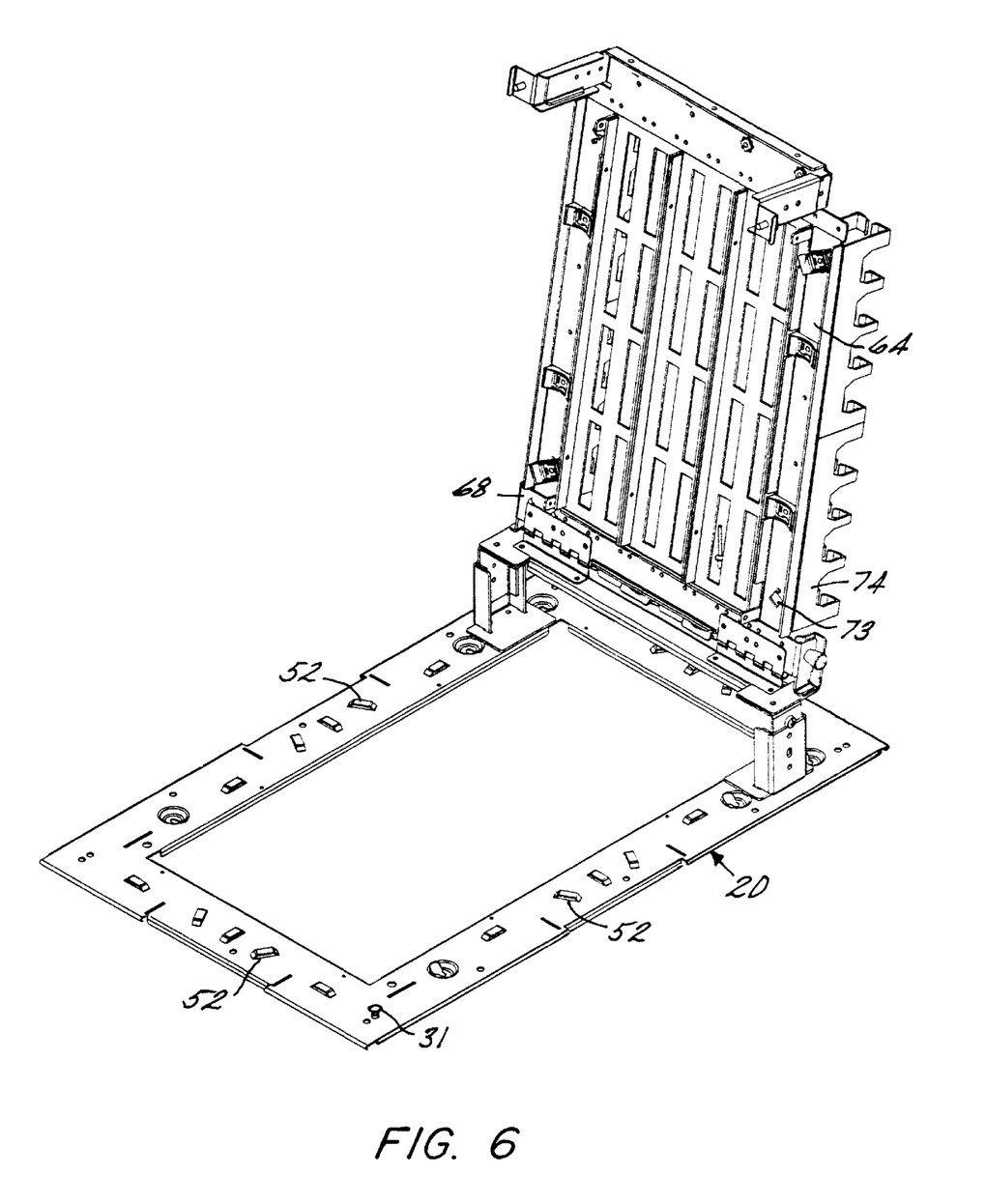
FIG. 6 is a perspective view of the of mounting plate and the patch panel mounting assembly.
Figure 7:
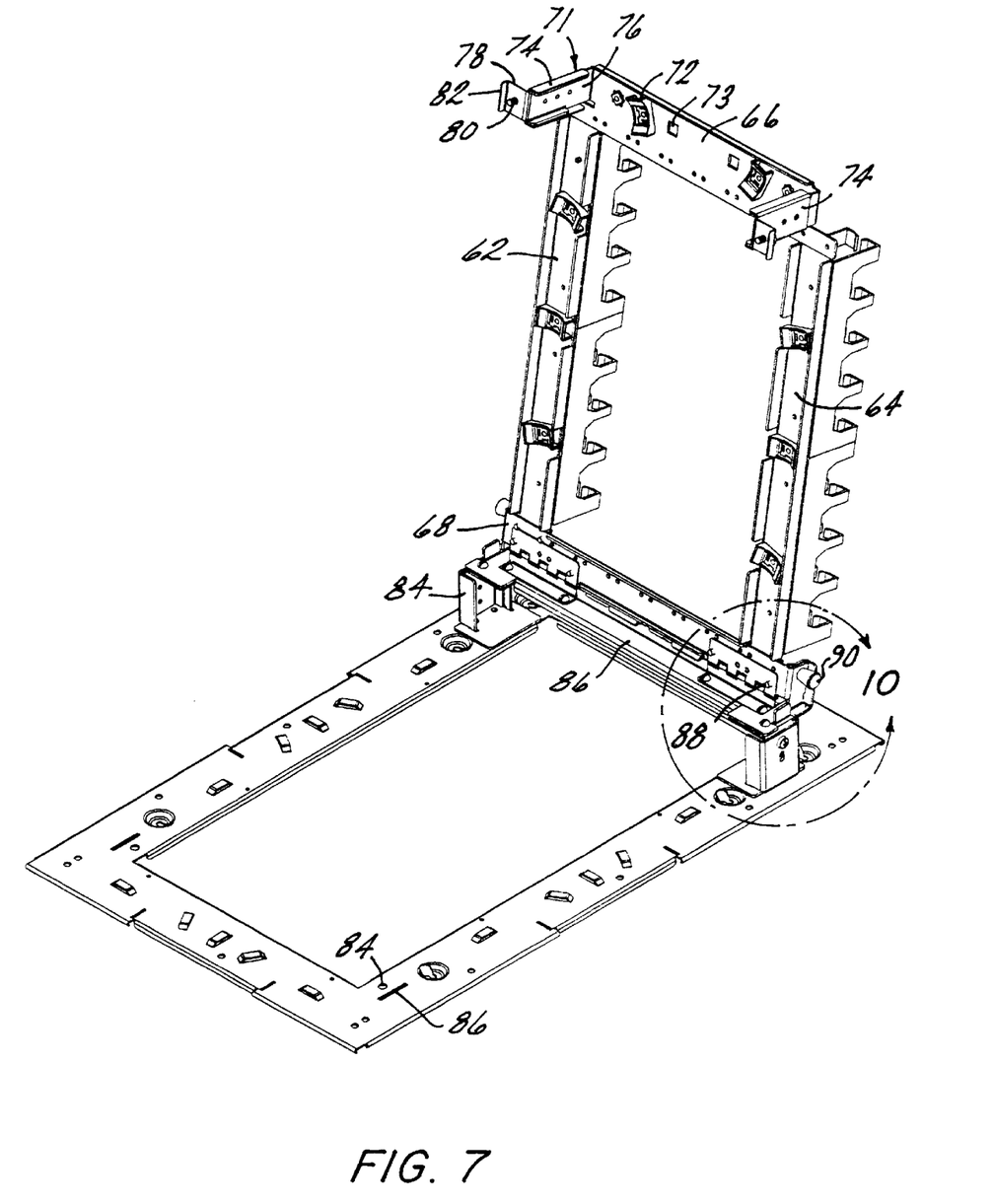
FIG. 7 is a perspective view of the mounting plate and the patch panel mounting assembly.

FIG. 6 is a perspective view of the patch panel mounting assembly 30 mounted to the mounting plate 20 and in an open position. The patch panel mounting assembly is hingedly attached to the mounting plate 20 and can be placed in a closed position (as shown in FIG. 5) or an open position as shown in FIG. 6. The patch panel mounting assembly 30 includes two side brackets 62 and 64 and two end brackets 66 and 68. These four brackets are joined at their ends to form a rectangular support bracket having a central opening. As shown in FIG. 6, patch panels 70 are mounted in the central opening by attaching the ends of the patch panels 70 to each end bracket 66 and 68. A series of openings 73 are formed in the side brackets 62 and 64 to mount cable managers 72 to the side brackets 62 and 64. Cable managers 72 may be of type sold by The Siemon Company under part number RS-VCM. These cable managers receive a cable retainer in the form of hook and loop type material. End brackets 66 and 68 similarly have openings formed therein for receiving cable managers 72 (FIG. 7). Cable management conduits 74 are mounted to the top surface of side brackets 62 and 64 and may be of the type sold by The Siemon Company. The combination of the protrusions 52 and the wire managers 72 provides numerous cable bundle tie down locations within the enclosure to establish the effective cable management.

FIG. 7 is a perspective view of the patch panel mounting assembly 30 in the open position with the patch panels 70 mounted thereto. A first end bracket 66 includes two adjustable stand-off legs 71. The adjustable legs are made up of an outer, u-shaped member 74 and an inner, u-shaped member 76 that travels within the u-shaped member 74. The inner member 76 is integral with the end bracket 66 and is formed by bending. Holes are provided in both the outer member 74 and the inner member 76 and the height of the leg 71 is adjusted by moving the inner member 76 relative to the outer member 74. To secure the inner member 76 to the outer member 74, a fastener is mounted through aligned holes in the inner member 76 and the outer member 74.

The outer member 74 includes a foot 78 having a fastener 80 and a lip 82. Mounting plate 20 includes holes 84 and slots 86 that receive fasteners 80 and lips 82 respectively. This interference between the fasteners 80 and the holes 84 and the lips 82 and the slots 86 aligns the patch panel mounting assembly 30 with the mounting plate 20 and supports the free end of the patch panel mounting assembly 30. A second set of adjustable stand-off legs 84 is mounted to the mounting plate 20. Stand-off legs 84 are similar in construction to stand-off legs 74. A hinge plate 86 is mounted to the stand-off legs 84 and a pair of hinges 88 secure the hinge plate 86 to end bracket 68. The hinges 88 allow the side brackets 62 and 64 and the end brackets 66 and 68 to rotate away from the mounting plate 20 as a unit. The hinging capability of the patch panel mounting assembly 30 allows an installer to quickly access and dress connecting blocks from the rear of the panels 70. End bracket 68 includes a pair of pins 90 for holding the patch panel mounting assembly 30 in the open position as will be described below. This exposes the rear surface of patch panels 70 and facilitates wiring.

Figure 8:
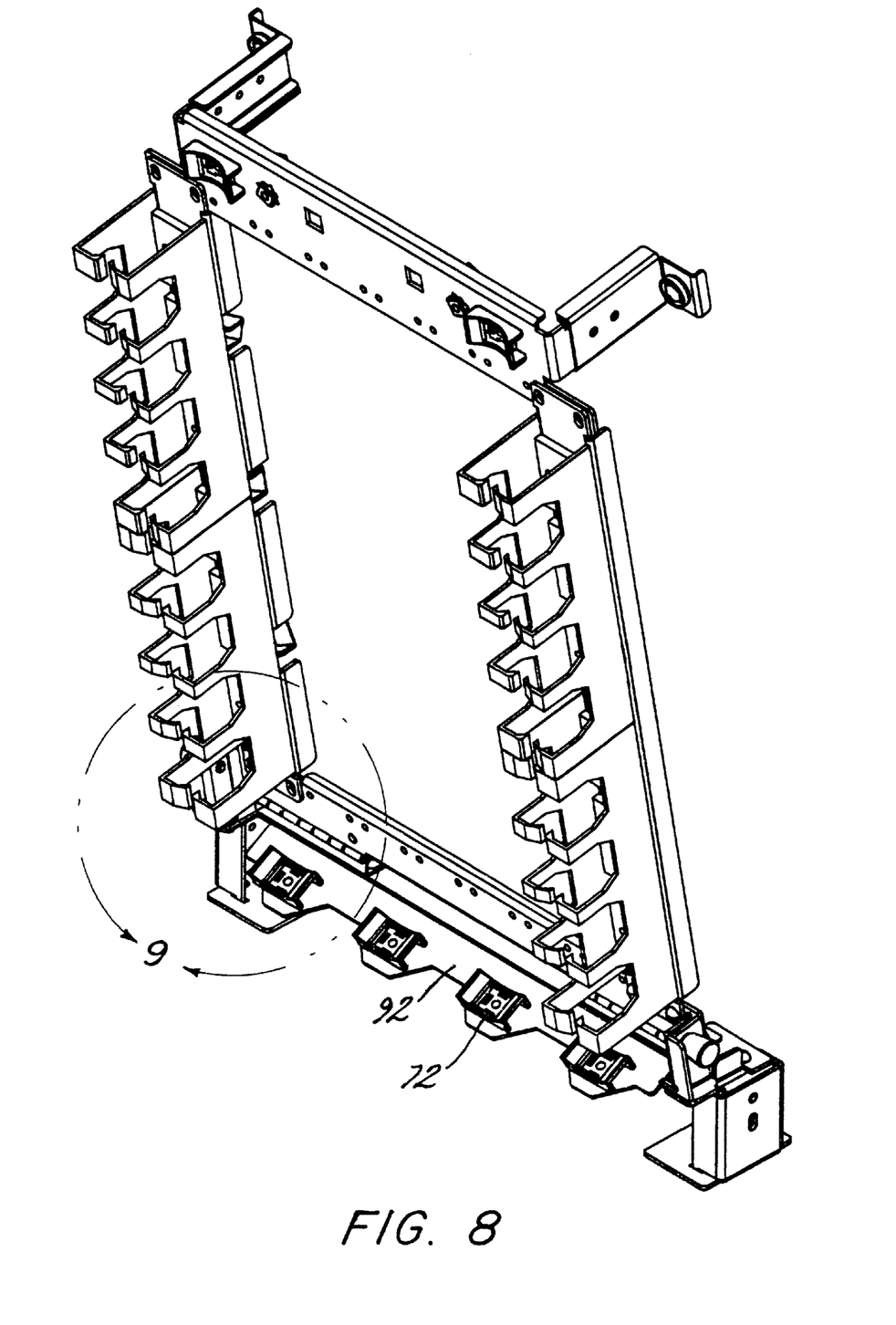
FIG. 8 is a perspective view of the patch panel mounting assembly.
Figure 9:
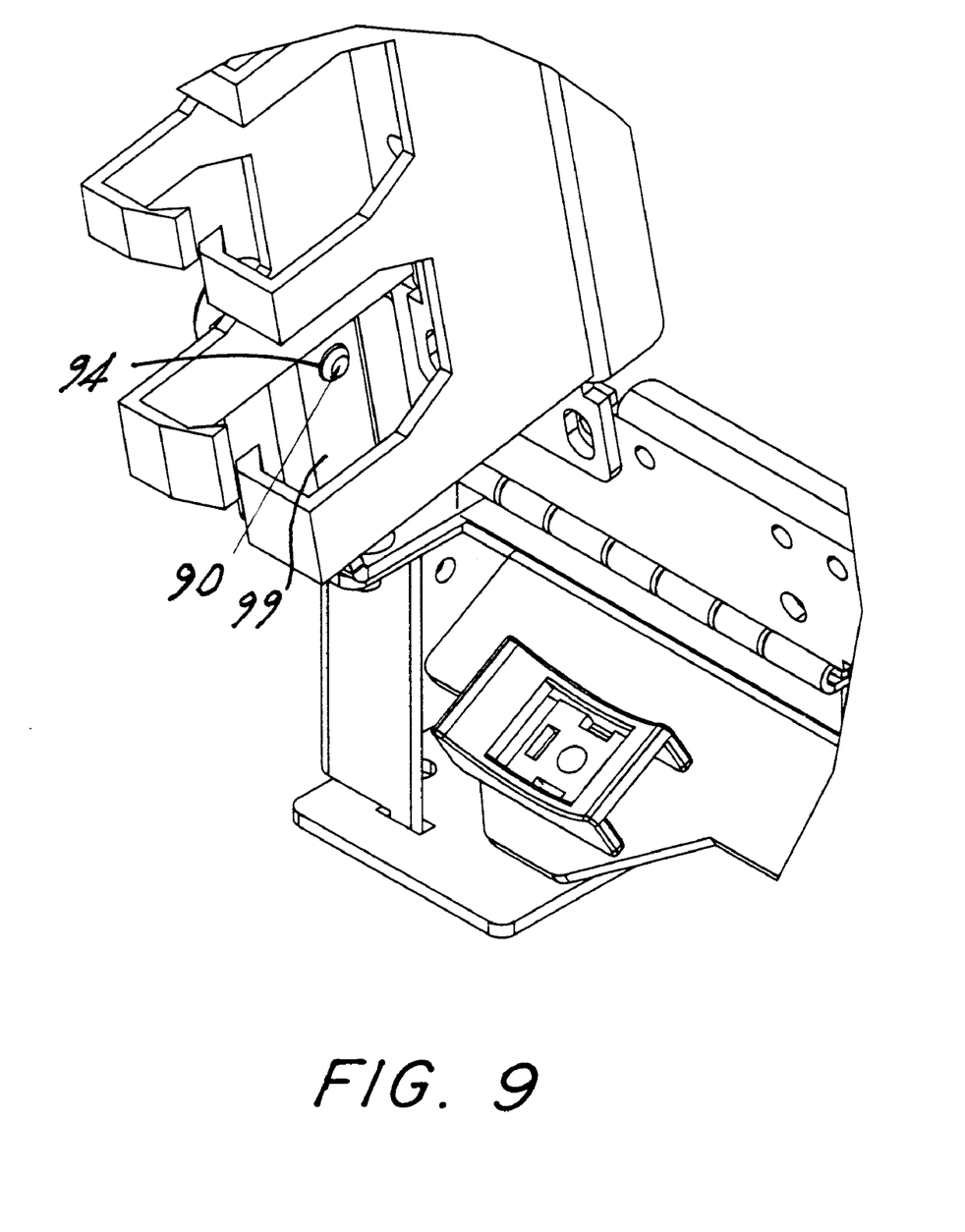
FIG. 9 is an enlarged view of a portion of FIG. 8.

FIG. 8 is another perspective view of the patch panel mounting assembly in the open position. The mounting plate 20 is not shown for clarity. As show in FIG. 8, the hinge plate 86 includes an integral extension plate 92 projecting away from the hinge plate at an oblique angle. The extension plate 92 includes openings for receiving cable managers 72. FIG. 9 is an enlarged view of a portion of FIG. 8. As shown in FIG. 9, pin 90 engages a hole 94 formed in a pin retaining bracket 99 connected to hinge plate 86 to hold the patch panel mounting assembly 30 in the open position as will be described below.

Figure 10:
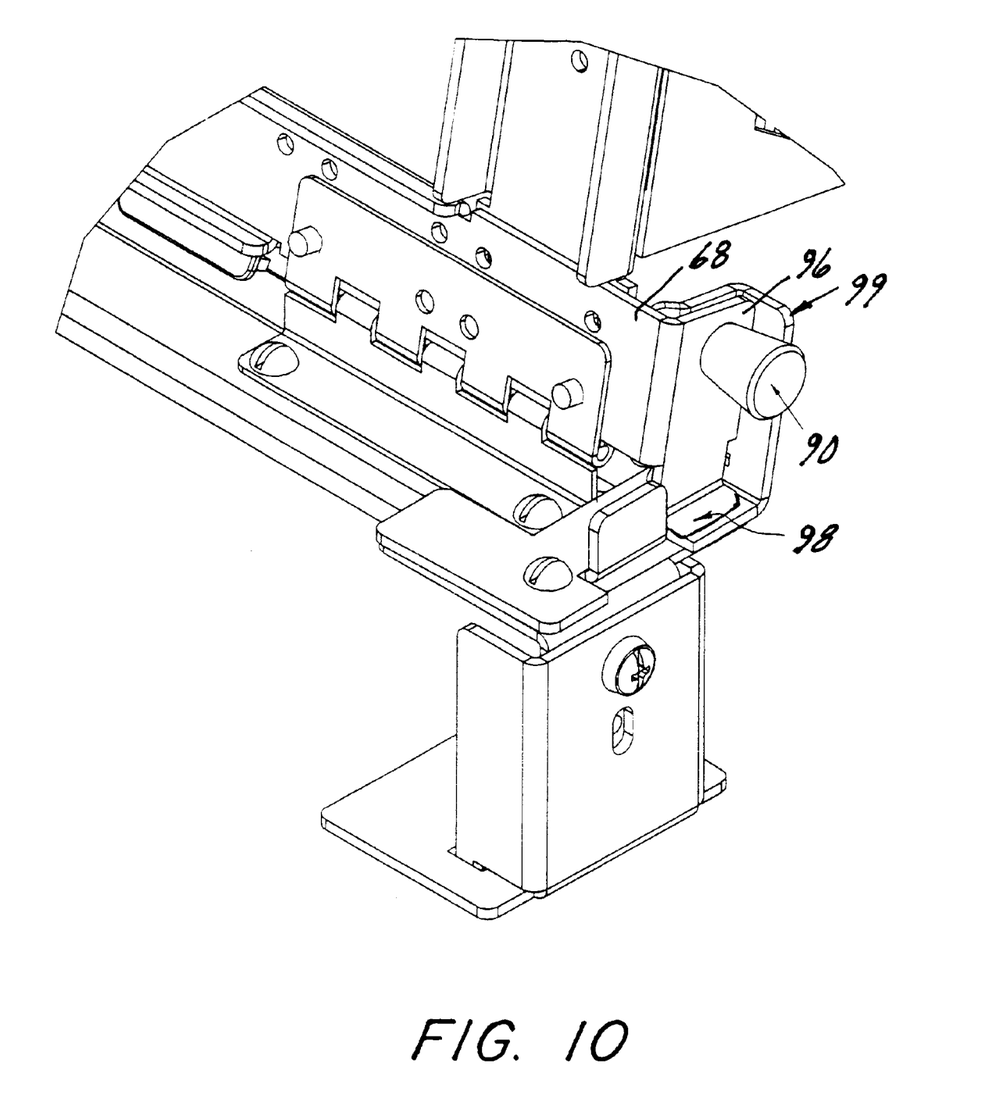
FIG. 10 is an enlarged view of a portion of FIG. 7.
Figure 11:
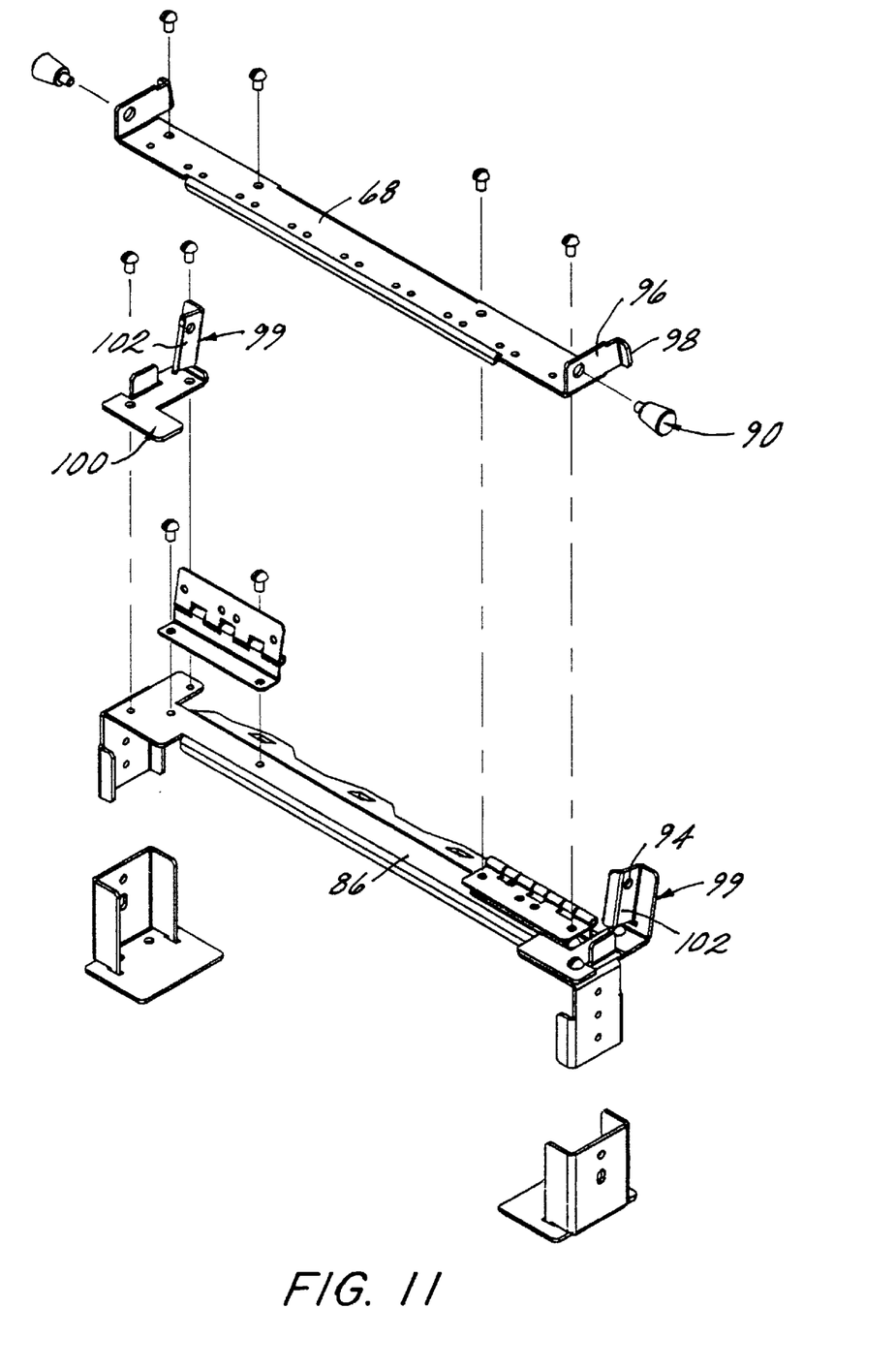
FIG. 11 is an exploded, perspective view of a portion of the patch panel mounting assembly.

FIG. 10 is an enlarged view of a portion of FIG. 7. FIG. 11 is an exploded perspective view of the hinge plate 86 and the end bracket 68. Referring to FIGS. 10 and 11, the end bracket 68 includes a pin mounting tab 96 which is formed by bending the end bracket 68 by approximately ninety degrees. A stop plate 98 extends away from pin mounting tab 96 and contacts a pin retaining bracket 99 and serves as a stop when the patch panel mounting assembly 30 is rotated into the open position. The pin retaining bracket 99 is mounted to the hinge plate 86 through fasteners. The pin retaining bracket 99 includes a flat base 100 and a retention flange 102 extending away from base 100. The retention flange has a hole 94 therein for receiving pin 90. Pin 90 may be a spring loaded plunger type pin such as those sold by Southco Inc. The spring loaded pin 90 directs the pin tip towards retention flange 102 and prevents the pin 90 from being inadvertently dislodged from hole 94.

Figure 12:
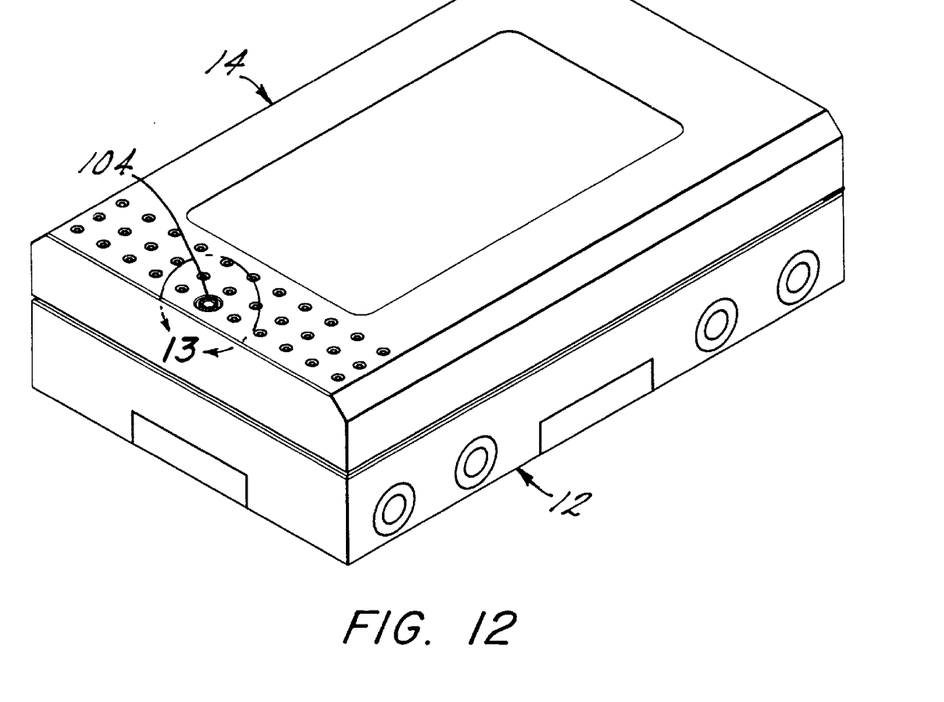
FIG. 12 is a perspective view of the consolidation point enclosure.
Figure 13:
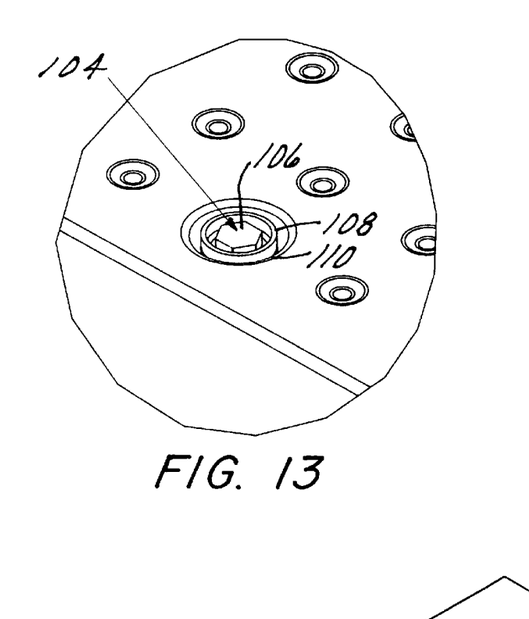
FIG. 13 is an enlarged view of a portion of FIG. 12.
Figures 14, 15, 17:
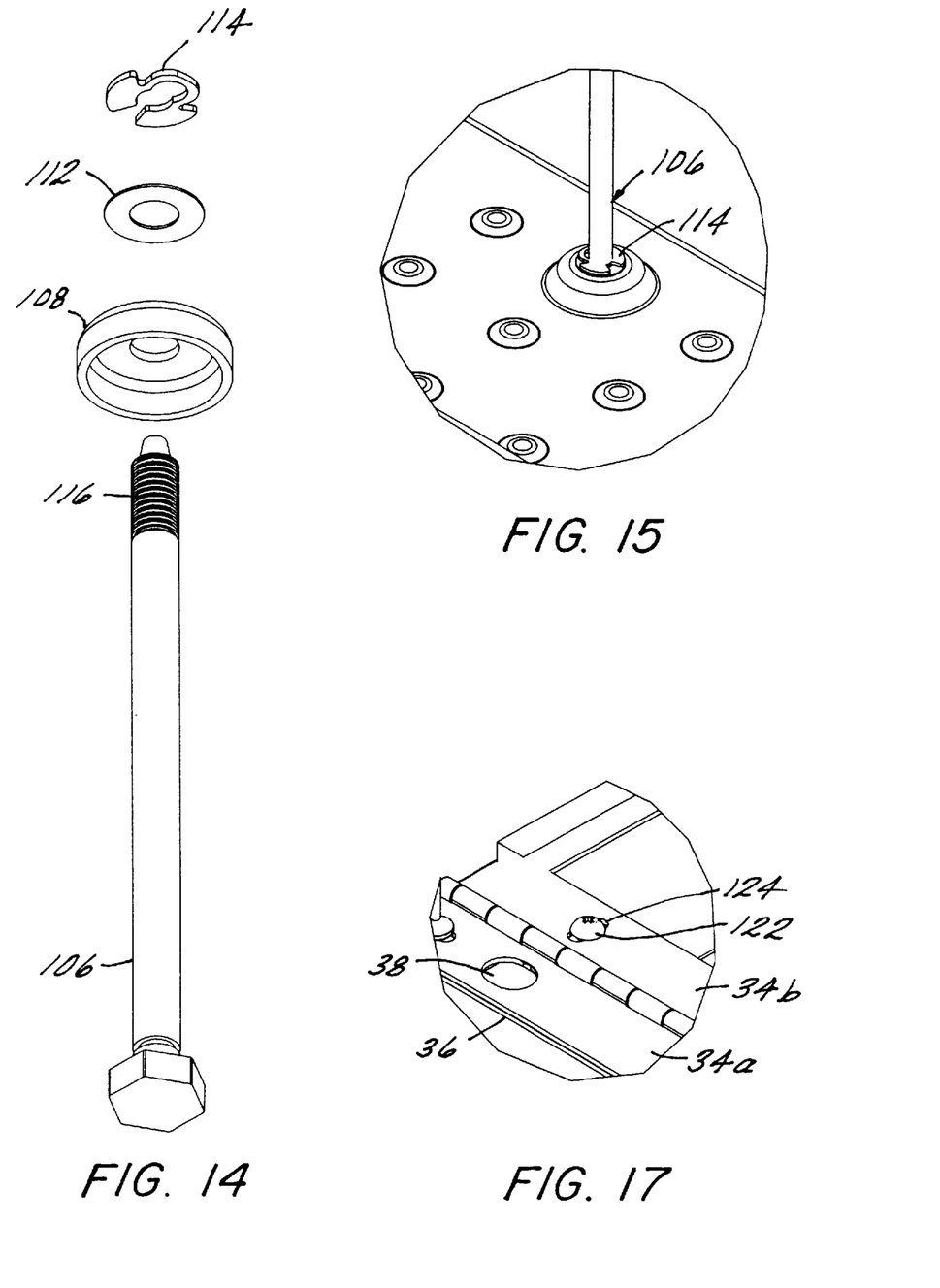
FIG. 14 is an exploded view of the consolidation point enclosure lock.
FIG. 15 is an enlarged view of a portion of the underside of the consolidation point enclosure cover.
FIG. 17 is an enlarged view of a portion of FIG. 16.

FIG. 12 is a perspective view of the consolidation point enclosure with cover 14 in the closed position. The cover includes a lock 104 that secures the cover 14 to base 12. The lock 104 is a captive hex head bolt 106 which is recessed in a cup type washer 108 and can only be opened using a special thin walled socket wrench. This type of lock is useful because it eliminates the need for a resident key-keeper which could interfere with timely service and maintenance of the housed equipment. FIG. 13 is an enlarged view of a portion of FIG. 12 showing the lock 104. The lock 104 includes a hex head bolt 106 positioned within a cup washer 108 positioned within a recess 110 in cover 14. As shown in FIGS. 14 and 15, the lock 104 also includes a flat washer 112 and a collar 114 positioned on the underside of cover 14. The collar 114 is secured around the shaft of hex head bolt 106 and secures the hex head bolt to the cover 14. Threads 116 on the hex head bolt 106 engage a threaded hole 118 on a flange 120 (FIG. 16) on base 12 and secure the cover 14 to base 12 to prevent cover 14 from being opened.

Figure 16:
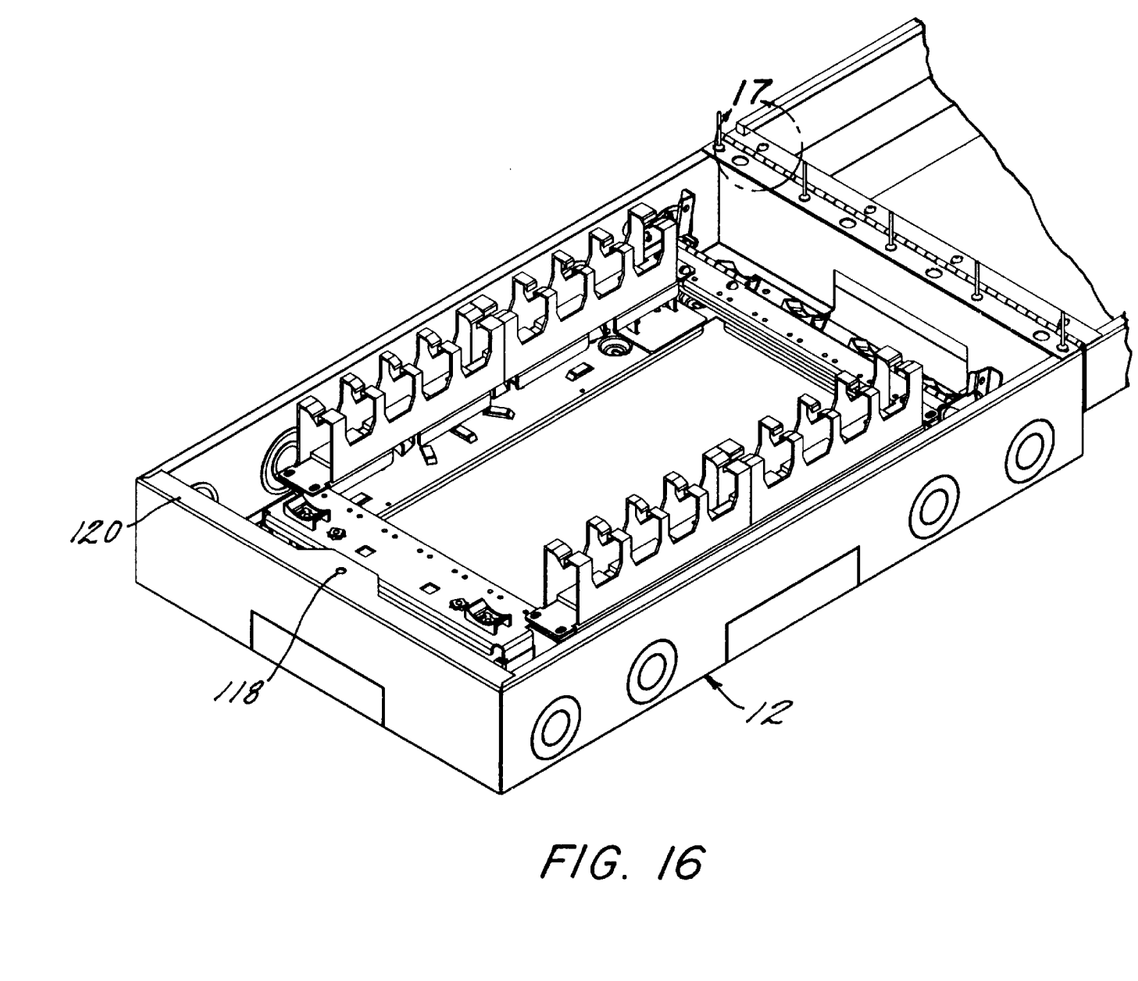
FIG. 16 is a perspective view of the consolidation point enclosure with the cover open.

FIG. 16 is a perspective view of the consolidation point enclosure with the cover 14 in the open position and the patch panel mounting assembly 30 in the closed position. Hinge 34 couples the cover 14 and the base 12. As shown in FIG. 17, the hinge 34 is made up two hinge halves 34a and 34b. Hinge half 34a is secured to flange 36 through fasteners. Hinge half 34b is secured to cover 14 through fasteners 122. Hinge half 34a and flange 36 include clearance openings 38 that allow access to fasteners 122 from the rear of the consolidation point enclosure when the cover 14 is closed. This facilitates manufacturing in that the lock 104 can first be aligned with and secured to hole 118 on the base 12. Subsequently, the hinge half 34b can be secured to cover 14 from the rear of the consolidation point enclosure. Clearance openings 38 allow a tool to access the fasteners 122 when the cover 14 is closed. Hinge half 34b includes oblong slots 124 to allow the cover 14 to move slightly relative to the base 12 prior to securing the cover 14 to the base 12 through hinge 34. This design allows the lock 104 to be secured to base 12 first and then the hinge 34 secured to cover 12. This reduces the likelihood that the lock 104 and hole 118 will be misaligned during manufacture.

Figure 18:
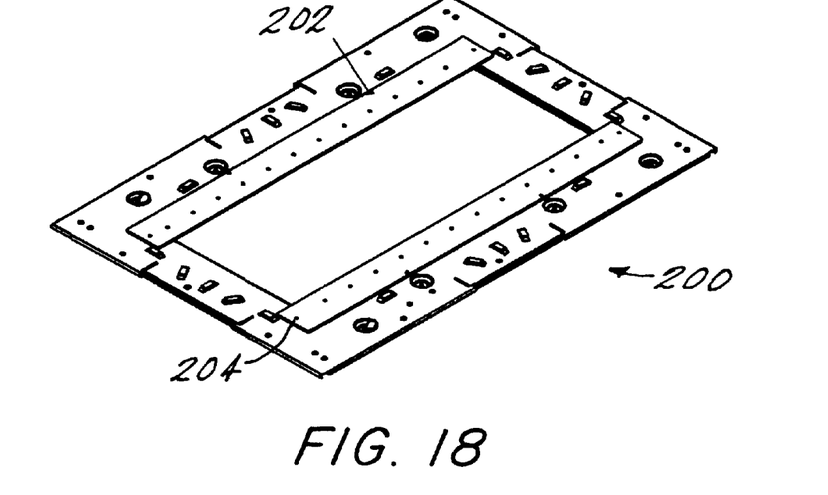
FIG. 18 is a perspective view of an alternative mounting plate.
Figure 19:
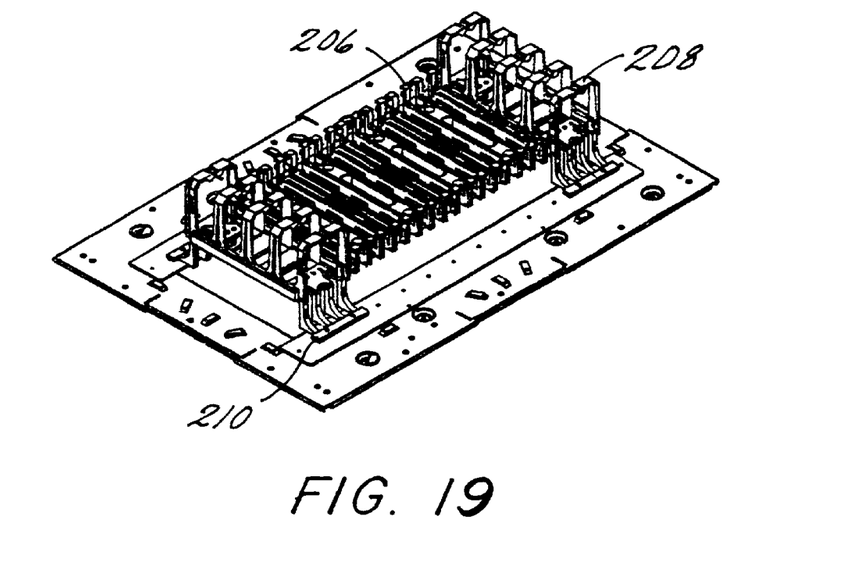
FIG. 19 is a perspective view of the mounting plate of FIG. 18 mounted with wiring products.
Figure 20:
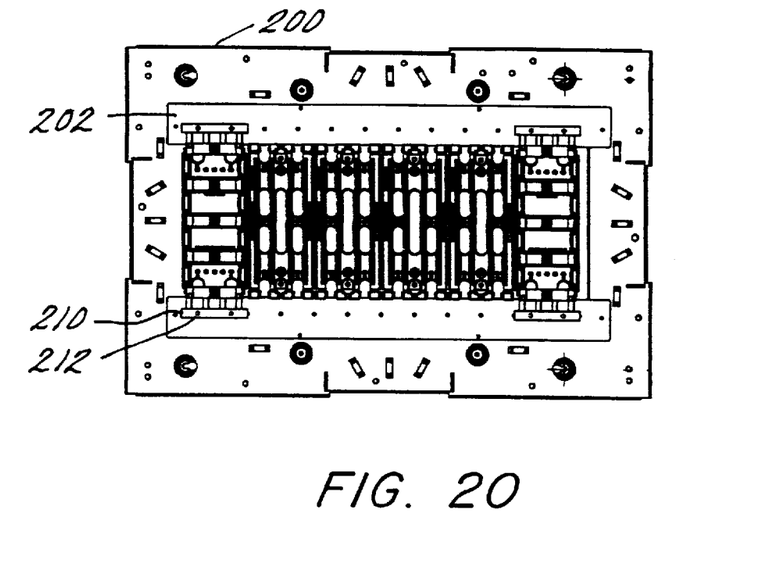
FIG. 20 is a top view of the mounting plate of FIG. 18 mounted with wiring products.
Figure 21:
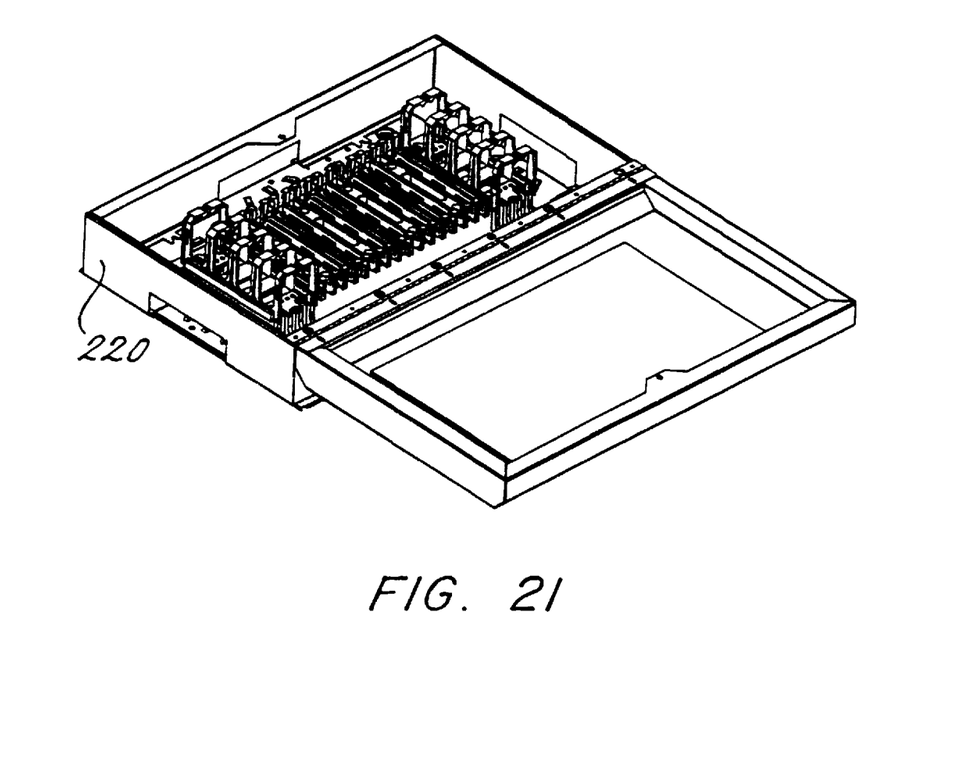
FIG. 21 is a perspective view of the mounting plate of FIG. 18 mounted in an alternative cover subassembly.

An alternative mounting plate 200 is shown in FIG. 18. Mounting plate 200 is similar to mounting plate 20 but includes support plates 202 having a series of holes 204 formed therein. Holes 204 are arranged in a line along the length of support plate 202. As shown in FIG. 19, support plates 202 are design to support the legs 210 of 110 type wiring devices such as wiring blocks 206 and wire managers 208. The legs 210 include holes 212 (FIG. 20) that are aligned with holes 204 and receive a fastener to secure legs 210 to support plate 202. The legs of wiring blocks 206 are removed for clarity. Suitable 110 type wiring products are those sold by The Siemon Company under the brand name S110. FIG. 20 is a top view of the mounting plate 200 fitted with 110 type wiring devices. FIG. 21 is a perspective view of a cover subassembly 220 mounted with mounting plate 200. Cover subassembly 220 is similar to cover subassembly 10. Cover subassembly 220 can be removed from the mounting plate 200 similar to cover subassembly 10 and mounted in one of two orientations.

Figure 22:
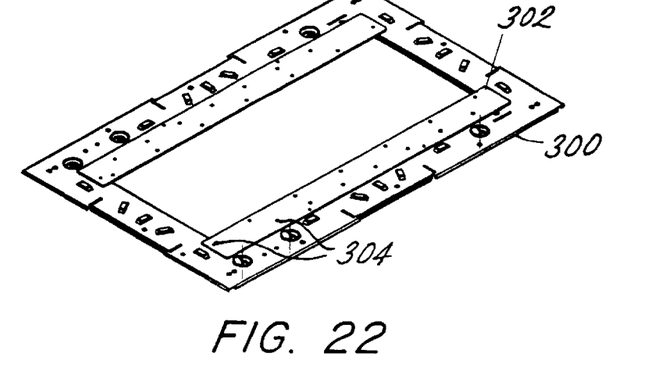
FIG. 22 is a perspective view of yet another alternative mounting plate.
Figure 23:
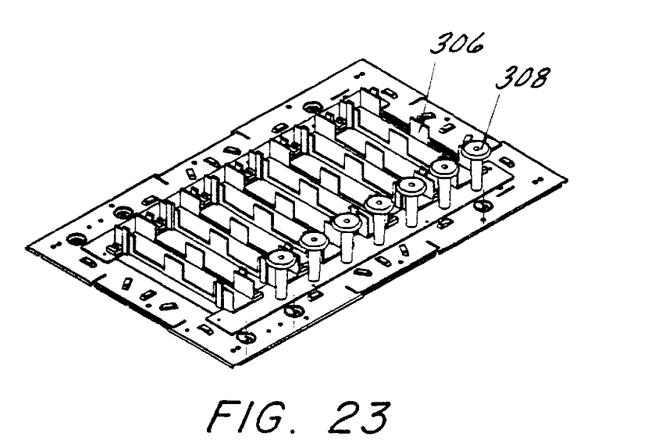
FIG. 23 is a perspective view of the mounting plate of FIG. 22 mounted with wiring products.
Figure 24:
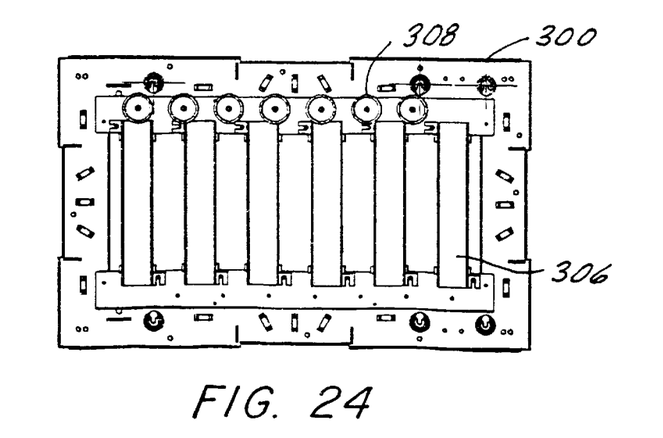
FIG. 24 is a top view of the mounting plate of FIG. 22 mounted with wiring products.

Another alternative mounting plate 300 is shown in FIG. 22. Mounting plate 300 is similar to mounting plate 20 but includes support plates 302 having a series of holes 304 formed therein. Holes 304 are arranged in two parallel lines along the length of support plate 302. As shown in FIG. 23, support plates 302 are designed to support the 66 type wiring devices such as stand off brackets 306 and wire spools 308. A first row of holes 304 receives a mounting tab on the stand-off bracket 306 and the second row of holes 304 receives the wire spools 308. Suitable 66 type products are those sold by The Siemon Company under the brand name S66. FIG. 24 is a top view of the mounting plate 300 fitted with 66 type wiring devices.

The device of the invention comprises three separate enclosures which are used for housing and protecting 110 connecting blocks, 66 connecting blocks and 19" panel mounted connecting blocks and patch panels.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A consolidation point enclosure comprising:
    a subassembly having:
        a rectangular base including two side walls and two end walls and having a central opening therein; and a cover hingedly attached to said base; and a mounting plate removably mounted to said base, said base being positioned between said mounting plate and said cover wherein said base is mountable to said mounting plate in a left orientation for opening on left side or a right orientation for opening on right side.

2. The consolidation point enclosure of claim 1 wherein:
    one of said side walls and said end walls includes a notch for providing a cable entrance to said consolidation point enclosure.

3. The consolidation point enclosure of claim 2 wherein said base further comprises a knockout.

4. The consolidation point enclosure of claim 2 further comprising a flush mount panel for sealing said notch.

5. The consolidation point enclosure of claim 1 wherein said cover further comprises a foam gasket along a bottom edge of said cover for sealing against said base.

6. The consolidation point enclosure of claim 1 further comprising a patch panel mounting assembly for receiving patch panels.

7. A consolidation point enclosure comprising:
    a subassembly having:
        a rectangular base including two side walls and two end walls and having a central opening therein; and
        a cover hingedly attached to said base; and
    a mounting plate removably mounted to said base wherein said base includes an extension plate positioned on said base, said extension plate having first and second openings formed therein for receiving a fastener on said mounting plate.

8. The consolidation point enclosure of claim 7 wherein said first and second openings each includes a first portion and second portion, the second portion having an inner dimension smaller than an inner dimension of the first portion.

9. The consolidation point enclosure of claim 8 wherein said first opening is oriented in a first direction and said second opening is oriented in a second direction opposite said first direction.

10. A consolidation point enclosure comprising:
    a subassembly having:
        a rectangular base including two side walls and two end walls and having a
        central opening therein; and
        a cover hingedly attached to said base; and
    a mounting plate removably mounted to said base wherein said cover is joined to said base through a hinge, said hinge having a first hinge half having a plurality of clearance holes therein for providing access to a fastener in a second hinge half when said hinge is closed.

11. A consolidation point enclosure comprising:
    a subassembly having:
        a rectangular base including two side walls and two end walls and having a
        central opening therein; and
        a cover hingedly attached to said base; and
    a mounting plate removably mounted to said base;
        wherein one of said side walls and said end walls includes a notch for providing a cable entrance to said consolidation point enclosure;
    wherein said mounting plate includes a plurality of protrusions having openings therein for receiving cable managers.

12. The consolidation point enclosure of claim 11 wherein said protrusions are arranged in a group and said group is aligned with said notch.

13. A consolidation point enclosure comprising:
    a subassembly having:
        a rectangular base including two side walls and two end walls and having a
        central opening therein; and
        a cover hingedly attached to said base; and
    a mounting plate removably mounted to said base wherein said mounting plate includes support plates for receiving 110-type wiring products.

14. The consolidation point enclosure of claim 13 wherein said support plates include a plurality of mounting holes arranged in a line along a length of said support plates.

15. A consolidation point enclosure comprising:
    a subassembly having:
        a rectangular base including two side walls and two end walls and having a
        central opening therein; and
        a cover hingedly attached to said base; and
    a mounting plate removably mounted to said base wherein said mounting plate includes support plates for receiving 66-type wiring products.

16. The consolidation point enclosure of claim 15 wherein said support plates include a plurality of mounting holes arranged in two lines along a length of said support plates.

17. A consolidation point enclosure comprising:
    a subassembly having:
        a rectangular base including two side walls and two end walls and having a
        central opening therein; and
        a cover hingedly attached to said base; and
    a mounting plate removably mounted to said base;
    a patch panel mounting assembly for receiving patch panels wherein said patch panel mounting assembly includes:
        two side brackets, a first end bracket and a second end bracket defining a rectangular support member; and
        stand-off legs attached to said first end bracket.

18. The consolidation point enclosure of claim 17 wherein said patch panel mounting assembly further comprises:
    a hinge plate mounted to said second end bracket through a hinge; and
    stand-off legs attached to said hinge plate.

19. The consolidation point enclosure of claim 18 wherein said second end bracket includes a pin and further comprising:
    a pin retaining plate connected to said hinge plate and having a hole therein for receiving said pin and securing said patch panel mounting assembly in an open position.

20. The consolidation point enclosure of claim 17 wherein stand-off legs attached to said first end bracket have an adjustable height.

21. The consolidation point enclosure of claim 18 wherein stand-off legs attached to said hinge plate have an adjustable height.

* * * * *